United States Patent [19]

Harless et al.

[11] Patent Number: 5,145,240

[45] Date of Patent: Sep. 8, 1992

[54] AIR BRAKE SAFETY AND ANTI-THEFT VALVE ASSEMBLY

[76] Inventors: Ronald L. Harless, 750 N. Main St., Franklin, Ind. 46131; Robert T. Buehl, 7994 W. Road 75 North, Bargersville, Ind. 46106; Steven R. Musgrave, R.R. #8, Box 83, Shelbyville, Ind. 46176

[21] Appl. No.: 660,300

[22] Filed: Feb. 22, 1991

[51] Int. Cl.5 .............................................. B60T 17/18
[52] U.S. Cl. ...................................... 303/89; 303/92; 188/265; 188/353
[58] Field of Search ................ 303/89, 92; 188/265, 188/353; 137/385; 280/428; 180/287

[56] References Cited

U.S. PATENT DOCUMENTS

| | | | |
|---|---|---|---|
| 3,973,805 | 8/1976 | Stevenson et al. | 303/89 X |
| 4,268,093 | 5/1981 | Müller | 303/89 |
| 4,478,459 | 10/1984 | Cumming | 303/7 |
| 4,543,984 | 10/1985 | Murray | 137/385 |
| 4,579,202 | 4/1986 | McIntosh | 192/0.09 |
| 4,593,954 | 6/1986 | Campanini | 303/7 |
| 4,621,874 | 11/1986 | Gustafsson | 303/89 |
| 4,633,686 | 1/1987 | Carr | 303/89 X |
| 4,658,608 | 4/1987 | Fox | 303/89 X |
| 4,678,068 | 7/1987 | Matthews et al. | 303/89 X |
| 4,697,852 | 10/1987 | Scholz | 303/7 |
| 4,708,406 | 11/1987 | Takagi et al. | 303/92 X |
| 4,721,192 | 1/1988 | Cano et al. | 188/353 |
| 4,786,116 | 11/1988 | Schulz | 303/40 |
| 4,793,661 | 12/1988 | Munro | 303/89 |
| 4,838,570 | 6/1989 | Toikka et al. | 280/507 |

OTHER PUBLICATIONS

F. Robinson, "Adaptation of The SQ3R' Method of Studying" from *Effective Study*, Career Publishing, Inc., 1988, pp. 151-165.

*Primary Examiner*—Charles A. Marmor
*Assistant Examiner*—Carla Mattix
*Attorney, Agent, or Firm*—Barnes & Thornburg

[57] ABSTRACT

An assembly is provided for use with a trailer including a plurality of wheels, normally engaged air brakes coupled to the wheels, and an air supply line coupled to the air brakes for supplying air to release the air brakes. The assembly includes a valve for selectively venting the air supply line to the atmosphere to prevent the release of the air brakes from their normally engaged position. The valve is coupled to the air supply line and is adjustable between a first position and a second position. In the first position, the valve seals the air supply line to permit the air brakes to be released when air is supplied to the air supply line. In the second position, the valve vents the air supply line to the atmosphere. When the valve is in its second position and air is supplied to the air supply line, the air is vented to the atmosphere. Therefore, in the second position, the valve means prevents the air brakes from being released when air is being supplied to the air supply line.

25 Claims, 2 Drawing Sheets

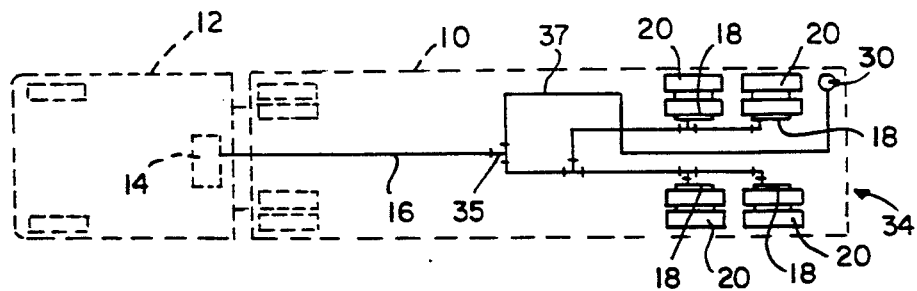
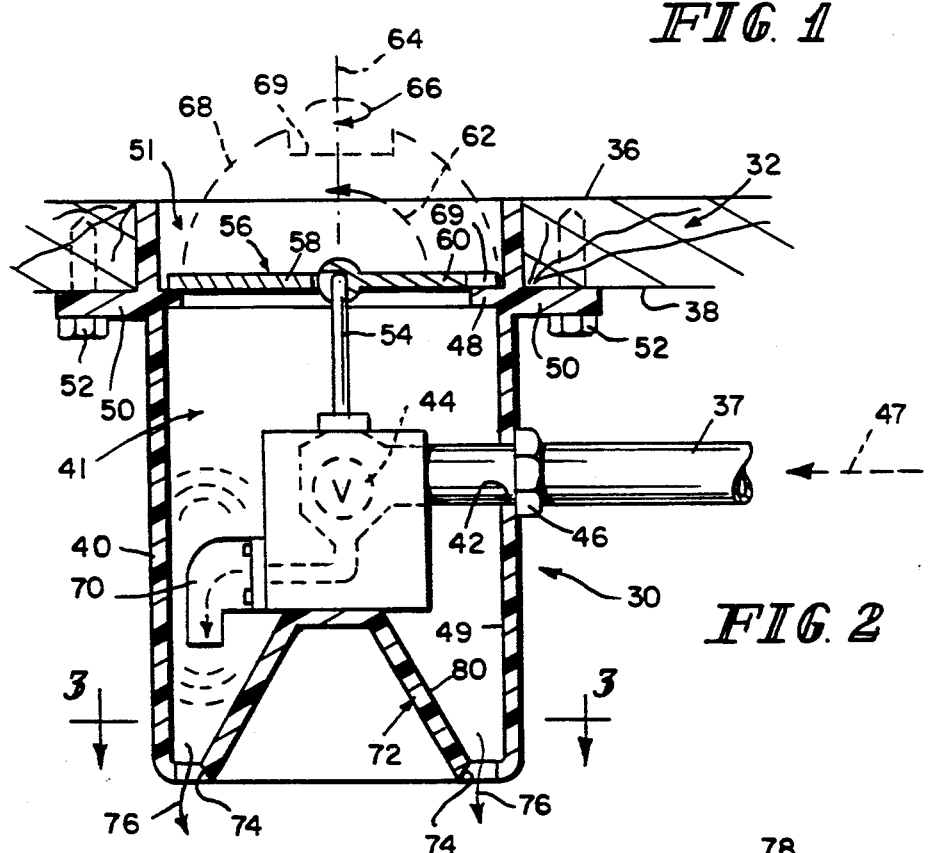
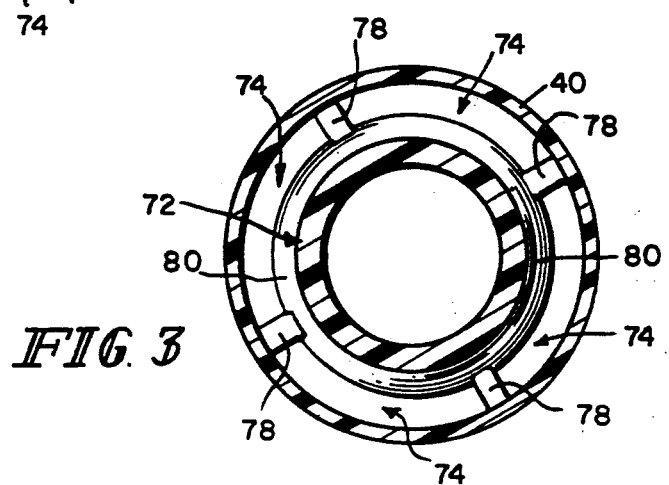

AIR BRAKE SAFETY AND ANTI-THEFT VALVE ASSEMBLY

BACKGROUND AND SUMMARY OF THE INVENTION

This invention relates to a valve assembly designed to be coupled to a trailer brake air line a trailer or the like to prevent a driver from deliberately or inadvertently moving the trailer from a parked position without an affirmative step being taken by a person in control of the trailer, such as a dockman in charge of loading or unloading the trailer.

Several devices are known in the art to provide protection for truck trailer brake assemblies. U.S. Pat. No. 4,621,874 relates to a vehicle theft preventing device acting on the brake system. The system includes a locking device comprising a three-way valve coupled an air line of the brake system. In an anti-theft arrangement, the valve directs air pressure supplied to the brake system from the tractor away from parking brakes and toward front brakes of the trailer so that no air is supplied to release the parking brakes.

U.S. Pat. No. 4,543,984 discloses a truck trailer brake airline lock. The lock is situated in a housing permanently attached to the front end of the trailer. The housing contains a valve which is actuated to maintain air pressure in the airlines of the brake system even after the truck is unhitched from the trailer and driven away. The trailer stays in place with air in its brake lines which maintains the brakes in an engaged position to inhibit theft of the trailer. This system is not used with spring biased brakes which require air pressure to release the brakes.

U.S. Pat. No. 4,593,954 discloses an air brake valve system which places all of the valves required at each axle within a single housing to produce a neater installation beneath the trailer chassis. This patent illustrates the 121 brake system which has been standard since 1975.

Parking or emergency air brakes on a trailer are typically biased to a normally engaged or locked position by a spring to lock the wheels on the trailer at times when air pressure is not supplied to an air line to release the brakes. The tractor or truck used to haul the trailer includes an air compressor which provides an air supply for releasing the brakes through a brake air line. This brake air line for controlling the parking and emergency brakes is typically referred to as the "red line". The "blue line" brake air line delivers air pressure to another portion of the trailer brakes to engage the brakes when a driver presses on the brake pedal in the truck.

When a trailer is parked at a loading dock or at another location, the truck is often removed from the trailer. Therefore, the air supply to the red line is removed. When the air supply is removed, the air brakes are biased to their normally engaged or locked position by the spring to lock the wheels to prevent movement of the trailer.

Numerous accidents occur each year when a trailer is left parked at a loading dock. Every so often, a driver will connect a truck to the parked trailer and hook up the air hoses to connect the air compressor to the brake lines of the trailer. Air pressure added to the red line releases the air brakes. The driver can then move the trailer from its parked position. Drivers are often responsible for hooking up their trucks to various trailers after the trailers have been loaded with cargo and moving the loaded trailers to another position on the lot. If the driver hooks up to the wrong trailer and moves the trailer before the dockman in charge of loading the trailer is ready, persons loading an interior portion of the trailer with cargo can be injured.

One object of the present invention is to provide a valve assembly coupled to the brake system of the trailer to prevent movement of the trailer without the cooperation from the dockman to adjust the valve assembly.

Another object of the present invention is to provide a warning system to alert workers in the trailer or a dock area that someone is attempting to move the trailer prematurely so that the workers can take precautionary measures.

According to the present invention, an assembly is provided for use with a trailer for holding cargo, a plurality of wheels, normally engaged air brakes coupled to the wheels, and an air supply line coupled to the air brakes for supplying air to release the air brakes. The assembly includes valve means for selectively venting the air supply line to the atmosphere to prevent the release of the air brakes from their normally engaged position. The valve means is coupled to the air supply line. The valve means is adjustable between a first position and a second position. In the first position, the valve means seals the air supply line to permit the air brakes to be released when air is supplied to the air supply line. In the second position, the valve means vents the air supply line to the atmosphere. When the valve means is in its second position and air is supplied to the air supply line, the air is vented to the atmosphere. Therefore, in the second position, the valve means prevents the air brakes from being released when air is being supplied to the air supply line.

In the illustrated embodiment of the present invention, the valve means is coupled to the trailer and configured so that the valve means is accessible and adjustable from within an interior region of the trailer. This permits the dockman to adjust the valve means between its first and second positions from the interior region of the trailer. Therefore, the dockman can have control over whether the brakes can be released. By giving the dockman control, the present invention advantageously reduces the likelihood that the trailer will be moved while workers are still loading the interior region with cargo. The valve means is preferably located near a rear door of the trailer so that the dockman can open the valve as soon as the rear doors are open, even with a full load on the trailer. The valve can remain open until cargo is unloaded from or loaded onto the trailer. By placing the valve means near the rear door, workers can load the trailer full of cargo while the valve is open. The dockman can then close the valve means just prior to closing the rear doors of the trailer.

Also in the illustrated embodiment, the assembly includes alarm means coupled to the valve means for providing an audible indication when air is being vented through the valve means to the atmosphere. When workers loading the interior region of the trailer hear the alarm sound, the workers can take precautionary measures, to reduce the risk of injury. The alarm means also alerts a driver that the valve is in its second position and that workers may be still loading the interior region of the trailer with cargo so that the driver will not attempt to move the trailer.

In this specification and in the claims, the word "trailer" is intended to refer to various types of trailers, flat beds, or trucks in which the driver is blind to cargo which use a 121 type air brake system or other brake system similar to the 121 system.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a diagrammatical illustration of the air brake control system of the present invention;

FIG. 2 is a sectional view taken through the valve assembly of the present invention mounted to a floor of a trailer or truck bed;

FIG. 3 is a sectional view taken through a first embodiment of lines 3—3 of FIG. 2 illustrating the configuration of a lower portion of a cylindrical housing of the present invention;

DETAILED DESCRIPTION OF THE DRAWINGS

Figure 4:
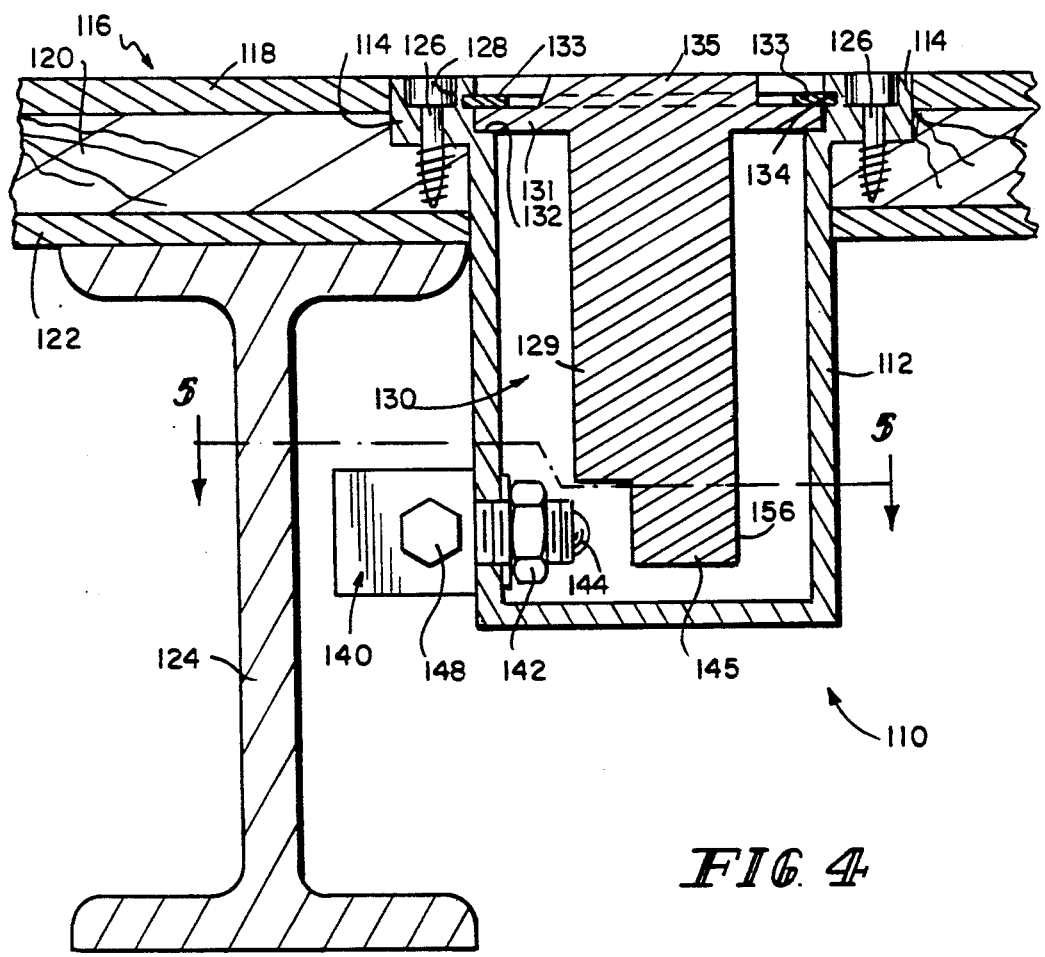
FIG. 4 is a sectional view taken through a second embodiment of the present invention.

Referring now to the drawings, FIG. 1 diagrammatically illustrates the "red line" portion of a brake system for a trailer 10. The outer dimensions of the trailer are illustrated by broken lines 10 in FIG. 1. The outer dimensions of a tractor or truck 12 used to transport trailer 10 are illustrated by broken lines 12 in FIG. 1. It is understood that the brake system of the truck 12 and trailer 10 includes several other parts which are not illustrated in FIG. 1 because these additional parts are outside the scope of the present invention. A more detailed explanation of the trailer air brake systems may be found in U.S. Pat. No. 4,593,954 discussed above.

Truck 12 includes an air compressor 14 which supplies air under pressure through brake line 16 to the brakes 18 of wheels 20. Brakes 18 are biased to a normally engaged or locked position by springs (not shown). When a driver moves truck 12 into position below trailer 10 and couples the air compressor 14 to the brake line 16 by a suitable coupler (not shown), air is supplied through brake line 16 to brakes 18. The air pressure in brake line 16 works against the springs in brakes 18 to release the brakes 18. Therefore, the driver can move trailer 10.

The valve control assembly 30 of the present invention is coupled to the floor 32 of trailer 18 in close proximity to the rear end doors 34 of trailer 10. Valve assembly 30 is coupled to brake line 16 by a T connector 35 and line 37. The configuration of valve assembly 30 of the present invention is best illustrated in FIG. 2. The valve assembly 30 is configured to be accessible from an interior region of trailer 10 so that a dockman or person in charge of loading or unloading the trailer 10 has control over releasing the brakes 18. The floor 32 of trailer 10 includes an interior surface 36 located within the interior region of the trailer 10 and exterior surface 38 facing the roadway below trailer 10. The dockman can access the control valve 30 from inside the trailer 10. By placing the control valve 30 in close proximity to rear doors 34, the trailer 10 can be fully loaded while the control valve 30 is open. After the trailer 10 is loaded, the dockman can close the control valve 30 to permit release of the brakes 18.

Control valve 30 includes a cylindrical housing 40 defining an interior region 41. Housing 40 is formed to include an aperture 42 to permit the brake line 37 to be coupled to a valve 44 by a suitable coupler 46. Air pressure from compressor 14 is supplied to valve 44 through brake line 16 and line 37 in the direction of arrow 47. Cylindrical housing 40 is formed to include an inner flange 48 which extends radially inwardly from the inner surface 49 of housing 40 near a top opening 51 of housing 40. Housing 40 also includes an outer flange 50 extending radially outwardly from housing 40 to permit the housing 40 to be coupled to the floor 32 by screws 52 or other suitable fasteners. Alternately, the housing 40 could be attached to the floor 32 by a flange (not shown) attached to interior surface 36. Housing 40 is mounted to lie below the interior surface 36 of floor 32. Therefore, the valve assembly 30 is out of the way of workers loading and unloading the interior region of the trailer 10. However, valve assembly 30 can be accessed from inside the interior region of trailer 10.

A valve stem 54 is located in the interior region 41 of housing 40. Valve stem 54 is coupled to valve 44 to control the position of valve 44. Illustratively, valve 44 is a rotary valve. The valve stem 54 is movable from a first position to close valve 44 and block air flow through valve 44 to a second position to open valve 44 and permit air to pass freely through valve 44 and through exhaust port 55. An upper face plate 56 is coupled to valve stem 54. Face plate 56 abuts the radially inwardly projecting flange 48 to prevent dirt or other articles from entering open upper end 51 of housing 40. Face plate 56 includes a first portion 58 and a pivotable second portion 60. Second portion 60 can be pivoted upward in the direction of arrow 62 to provide a tab for turning valve stem 54. After second portion 60 is pivoted upward to a vertical position illustrated by broken line 64, the face plate 56 can be rotated in the direction of arrow 66 to rotate valve stem 54. Illustratively, when valve 44 is in its open position, second portion 60 of face plate 56 is in the position illustrated by broken lines 68 in FIG. 2. Also, illustratively, when valve 44 is in its closed position, second portion 60 of face plate 56 is in the position illustrated by the solid lines in FIG. 2. Second portion 60 includes a notched portion 69 to permit the dockman to lift the second portion 60 easily to its vertical position. The "open" and "closed" positions of valve 44 can be marked on valve assembly 30 so that the notch 69 can be aligned with the marked positions. Therefore, a dockman can quickly open and close valve 44.

A whistle 70 or other air operated alarm is connected to exhaust port 55 of valve 44. When air is supplied to brake line 16 and valve 44 is open, air is exhausted rapidly through exhaust port 55. This prevents the air pressure from building up in brake line 16 to release the brakes 18. The escaping air sounds whistle 70 to alert the dockman and other workers that someone has connected the air compressor 14 of truck 12 to brake line 16. The whistle 70 also alerts the driver of the truck 12 that people are still working in the trailer.

A truncated conical portion 72 is located in a bottom portion of housing 40. The conical section 72 is configured to permit air escaping from exhaust port 55 to pass to the atmosphere through apertures 74 formed between the conical section 72 and housing 40 in the direction of arrows 76. The configuration of the conical section 72 is best illustrated in FIG. 2. Ribs 78 connect conical section 72 to housing 40 to suspend the conical section 72 within housing 40 as best illustrated in FIG. 3. The configuration of conical section 72 causes dirt particles or other articles in interior region 41 of housing 40 to fall due to gravity through apertures 74. The configuration of the conical portion 72 therefore permits air to escape housing 40 while minimizing the effect of road dirt entering internal region 41 of housing 40. Dirt which bounces into the interior region 41 of housing 40 will hit the sloped wall 80 of conical section 72 and fall from the interior region 41 onto the ground below the trailer 10. Conical section 72 also provides extra structural integrity to the housing 40.

In operation, the trailer 10 is hauled by truck 12 to a desired location such as a loading dock. Often, a driver will unhook the truck 12 from trailer 10 to permit an interior portion of trailer 10 to be loaded with cargo while the truck 12 connects to another loaded trailer. When truck 12 is disconnected from trailer 10, air compressor 14 is disconnected from brake line 16. Therefore, the spring activated brakes 18 are engaged or locked so that the wheels 20 cannot rotate. Before the workers begin loading the interior region of trailer 10, the dockman raises the second portion 60 of face plate 56 to its vertical position 64 and rotates the face plate to the dotted position 68 shown in FIG. 2. Preferably, control valve 30 is located near rear doors 34 for easy access by the dockman. By rotating the face plate 56, the dockman rotates valve stem 54 which in turn opens valve 44 to permit air to pass freely from brake line 16 through line 37 and through exhaust port 55 to the atmosphere. The second portion 60 of face plate 56 can then be lowered to a position below the interior surface 36 of floor 32 out of the way of workers loading the trailer. Workers then begin loading cargo into the interior region of trailer 10 using forklifts or the like. After the cargo is loaded onto trailer 10, the dockman raises second portion 60 of face plate 56 and rotates the face plate 56 back to its original position to close valve 44. This seals the end of brake line 37 and allows air pressure to enter brake line 16 and release the brakes 18. Therefore, after the trailer 10 has been loaded and the valve 44 has been closed, a driver can connect truck 12 to trailer 10 and move trailer 10 in a conventional way.

If, however, a driver attempts to hook up truck 12 to trailer 10 before the workers finish loading the interior region of trailer 10 and while the valve 44 is in its open position, air supplied through brake line 16 will pass through line 37 and through valve 44, through exhaust port 55, and through whistle 70. The open valve 44 prevents air pressure from building up in brake line 16 to release the brakes. Therefore, while valve 44 is in its open position, the brakes 18 cannot be released by air supplied through brake line 16. Whistle 70 alerts the dockman and the other workers that a driver has connected the truck 12 to the trailer 10 and that the air compressor 14 has been connected to brake line 16. Therefore, the workers can take precautionary measures and clear the trailer 10. This reduces the likelihood of injury to the workers loading the trailer 10. In addition, the driver of truck 12 is alerted by whistle 70 that the workers are still loading the trailer 10 so that the driver does not try to pull the trailer 10 away from the loading dock.

The present invention is also effective when trailer 10 is parked at a location other than at a loading dock. A driver can park trailer 10 and open valve 44. The driver can then lock the rear doors (not shown) of trailer 10 and leave trailer 10 parked. If another driver connects a truck to the trailer 10 to move or steal the trailer 10, the brakes 18 would not release because of the open valve 44 coupled to brake line 16. In addition, whistle 70 would sound an alarm that the driver has connected compressor 14 to brake line 16. Therefore, the valve assembly 30 would provide a deterrent to theft of trailer 10.

Figure 5:
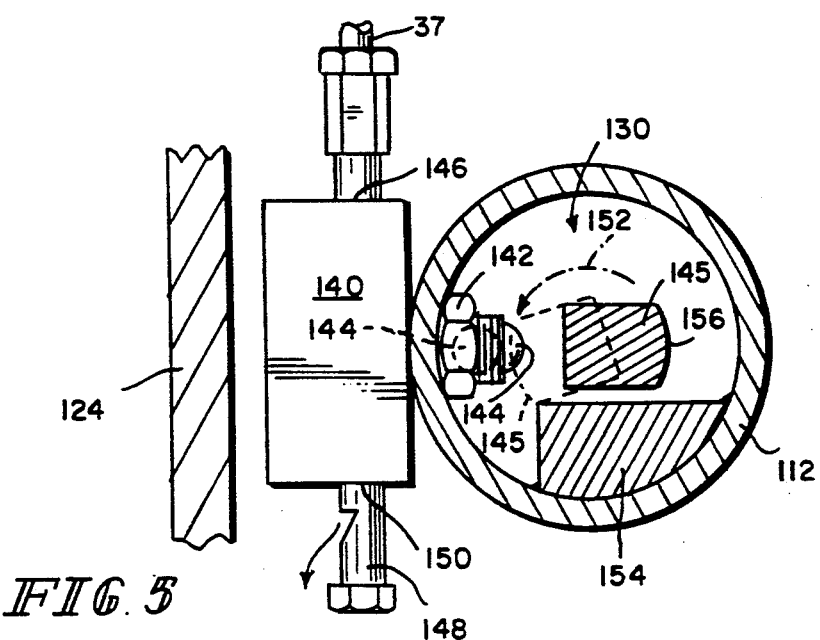
FIG. 5 is a sectional view taken through lines 5—5 of FIG. 4 illustrated operation of the valve assembly of FIG. 4.

Another embodiment of the present invention is illustrated in FIGS. 4 and 5. The valve assembly 110 includes a generally cylindrical housing 112 having an outwardly extending flange 114 located near a top end of housing 112 and a solid bottom portion 116. The valve assembly 110 is coupled to a truck bed substantially at the location illustrated by valve assembly 30 in FIG. 1. Truck bed 116 includes a top metal sheet 118, a center plywood sheet 120, and a bottom metal sheet 122. An I-beam 124 is located below truck bed 116 to provide support for truck bed 116. Flange 114 fits within a recessed portion formed in truck bed 116 to provide a flat surface for bed 116. Suitable fasteners such as screws 126 are used to couple the valve assembly 110 to the truck bed 116. Screws 126 extend through apertures 128 formed in flange 114 of cylindrical housing 112.

A control member 129 is situated within the interior region 130 of housing 112. An annular flange 131 extends away from a top end portion of control member 129. Annular flange 131 engages a ledge 132 formed in cylindrical housing 112 to suspend control member 129 within interior region 130 of housing 112. A snap ring 133 is situated within a slot 134 formed in flange 114 of housing 112 above ledge 132 to retain flange 131 of control member 129 in position against the ledge 132 to retain control member 129 in the position illustrated in FIG. 4. A projection 135 extends away from flange 131 of control member 129. Projection 135 permits the dockman to rotate control member 129 within housing 112 to open and close a valve 140. Valve 140 is coupled to housing 112 by a lock nut 142 situated within housing 112. Valve 140 is a normally closed valve and includes a ball 144 for opening and closing the valve 140. A cam member 145 is formed on control member 129 for engaging ball 144. Illustratively, valve 140 is a MV-40 valve available from Mead.

As illustrated in FIG. 5, valve 140 includes an inlet port 146 which is coupled to brake line 37 in a manner similar to the embodiment illustrated in FIGS. 2 and 3. Brake line 37 is preferable made from a copper tubing or other suitable material to prevent clamping of line 37 which could block air flow through line 37. A whistle 148 is coupled to an outlet port 150 of valve 140.

Valve assembly 110 is mounted in close proximity to I-beam 124 located beneath the bed 116 of the trailer. Therefore, I-beam 124 provides protection for valve 140 to reduce the likelihood that the valve 140 will be vandalized.

Operation of the assembly 110 is similar to operation of the assembly 30 in the first embodiment. Prior to loading or unloading the parked trailer, a dockman grasps the projection 135 of control member 129 and rotates the control member in a predetermined direction illustrated by arrow 152 in FIG. 5 to a predetermined location to open the valve. The "open" and "closed" positions of valve 140 can be marked on flange 114 of housing 112 so that the dockman can move the control member 129 to the desired position by aligning the projection 135 with the desired "open" or "closed" mark on flange 114. When the dockman rotates the control member 129, cam member 145 moves to the position illustrated by broken lines 145 in FIG. 5. A blocking member 154 is coupled to housing 112 to limit the range of rotational movement of control member 129 within housing 112. As control member 129 rotates in the direction of arrow 152, camming surface 156 of cam member 145 engages the ball 144 of valve 140 and moves or depresses the ball 144 to the position illustrated by broken lines 144 in FIG. 5 to open the valve.

After the cargo is loaded onto the trailer, the dockman rotates control member 129 back to its initial position to move cam member 136 back to its original position illustrated in FIGS. 4 and 5 to close valve 140. This seals the end of brake line 37 and allows pressure to enter brake line 16 and release the brakes 18. Therefore, after the valve 140 has been closed by the dockman, a driver can connect the truck to trailer 10 and move the trailer 10 in a conventional way.

If, however, a driver attempts to hook up the truck 12 to the trailer 10 before the workers finish loading the interior region of trailer 10 and while valve 140 is in its open position, air supply through brake line 16 will pass through line 37 and valve 140, through exhaust port 150, and through whistle 148. The open valve 140 prevents air pressure from building up in brake line 16 to release the brakes 18. Therefore, while valve 140 is in its open position, the brakes 18 cannot be released by air supply through brake line 16. Whistle 148 alerts the dockman and other workers that a driver has connected the truck 12 to the trailer 10 and that the air compressor 14 has been connected to brake line 16. Therefore, the workers can take precautionary measures and clear the trailer. This reduces the likelihood of injury to the workers loading the trailer. In addition, the driver of the truck is alerted by whistle 148 that the workers are still loading or unloading the trailer 10 so that the driver does not try to pull the trailer 10 away from the loading dock.

Although the invention has been described in detail with reference to a certain preferred embodiment, variations and modifications exist within the scope and spirit of the invention as described and defined in the following claims.

What is claimed is:

1. An assembly for use with a trailer for holding cargo, a plurality of wheels, normally engaged air brakes coupled to the wheels, and an air supply line coupled to the air brakes for supplying air to release the air brakes, the assembly comprising
   valve means for selectively venting the air supply line to the atmosphere to prevent the release of the air brakes from their normally engaged position, the valve means including an exhaust port,
   means for coupling the valve means to the air supply line, the valve means being adjustable between a first position to seal the air supply line and a second position to vent the air supply line to the atmosphere, and
   an alarm coupled to the valve means for providing an audible indication when air is vented through the valve means to the atmosphere, the alarm including a whistle coupled to the exhaust port of the valve means.

2. The assembly of claim 1, wherein the trailer includes an interior region and the valve means is coupled to the trailer and configured so that the valve means is accessible from the interior region of the trailer to permit the valve means to be adjusted from within the interior region of the trailer.

3. The assembly of claim 2, wherein the valve means is located in close proximity to a rear door of the trailer.

4. The assembly of claim 2, wherein the valve means is mounted to a floor of the trailer.

5. An assembly for use with a trailer having an interior region for holding cargo, a plurality of wheels, normally engaged air brakes coupled to the wheels, and an air supply line coupled to the air brakes for supplying air to release the air brakes, the assembly comprising valve means coupled to the trailer and configured so that the valve means is accessible and adjustable from within the interior region of the trailer, the valve means being adjustable between a first position and a second position, the first position closing the valve means to permit the air brakes to be released when air is supplied to the air supply line, and the second position opening the valve means to vent air supplied to the air supply line to the atmosphere to prevent the air brakes from being released when air is supplied to the air supply line, the valve means including a valve having an inlet and an outlet, means for coupling the air supply line to the inlet, and control means for adjusting the valve between its first position to close the valve and its second position to open the valve, the valve being situated inside a housing including an upper open end, the upper open end of the housing being coupled to the trailer in communication with the interior region of the trailer.

6. The assembly of claim 5, wherein the valve means is located in close proximity to a rear door of the trailer.

7. The assembly of claim 5, further comprising alarm means for providing an audible indication that air is passing through the valve means from the air supply line when the valve means is in its second open position.

8. The assembly of claim 7, wherein the alarm means includes a whistle coupled to an exhaust port of the valve means.

9. The assembly of claim 5, wherein the valve means is mounted to a floor of the trailer, the valve means being configured to lie below an interior surface of the floor.

10. The assembly of claim 5, further comprising a face plate for covering the upper open end of the housing, the face plate being coupled to the control means, the face plate being movable relative to the housing to adjust the position of the valve.

11. The assembly of claim 10, wherein the face plate includes a first portion and a second portion, the second portion being pivotable with respect to the first portion to provide a tab for rotating the face plate to adjust the position of the valve.

12. An assembly for use with a trailer having an interior region for holding cargo, a plurality of wheels, normally engaged air brakes coupled to the wheels, and an air supply line coupled to the air brakes for supplying air to release the air brakes, the assembly comprising
   a housing configured to define an internal chamber therein, the housing including upper and lower open ends, the upper open end being coupled to the trailer in communication with the interior region, a valve coupled to the housing, the valve having an inlet and an outlet, means for coupling the air supply line to the inlet of the valve, the valve being adjustable between a first position to close the valve to permit the air brakes to be released when air is supplied to the air supply line and a second position to open the valve to vent air supplied to the air supply line to the atmosphere to prevent the air brakes from being released when air is supplied to the air supply line, and control means located within the housing for adjusting the valve between the first position and a second position.

13. The assembly of claim 12, further comprising alarm means coupled to the outlet of the valve for providing an audible indication when air is being vented through the valve means to the atmosphere.

14. The assembly of claim 13, wherein the alarm includes a whistle coupled to the outlet of the valve.

15. The assembly of claim 12, wherein the control means includes a rotatable control member having a camming surface for engaging the valve upon rotation of the control member within the housing to open the valve.

16. The assembly of claim 15, wherein the housing includes a radially outwardly extending flange for coupling the housing to the trailer and the control member includes a radially outwardly extending flange for engaging a portion of the housing, and further comprising means for coupling the control member to the housing to seal the internal chamber of the housing.

17. The assembly of claim 15, further comprising means coupled to the housing inside the internal chamber for limiting the range of movement of the control member relative to the housing.

18. The assembly of claim 16, wherein the valve includes a ball actuator for opening and closing the valve, and means for coupling the valve to the housing so that the valve is located outside the housing and the ball actuator is located inside the housing, and the camming surface of the control member engages and depresses the ball upon rotation of the control member to open the valve.

19. An assembly for use with a trailer having an interior region for holding cargo, a plurality of wheels, normally engaged air brakes coupled to the wheels, and an air supply line coupled to the air brakes for supplying air to release the air brakes, the assembly comprising:

a housing configured to define an internal chamber therein, the housing including upper and lower open ends, the upper open end being coupled to the trailer in communication with the interior region;

a valve coupled to the housing, the valve including an inlet coupled to the air supply line and an outlet, the valve being adjustable between a first position to close the valve to permit the air brakes to be released when air is supplied to the air supply line and a second position to open the valve to vent air supplied to the air supply line to the atmosphere to prevent the air brakes from being released when air is supplied to the air supply line; and a control member located within the housing to adjust the valve between the first position and the second position.

20. The assembly of claim 19, further comprising an alarm coupled to the outlet of the valve to provide an audible indication when air is being vented through the valve to the atmosphere.

21. The assembly of claim 20, wherein the alarm includes a whistle coupled to the outlet of the valve.

22. The assembly of claim 19, wherein the control member includes a camming surface for engaging the valve upon rotation of the control member within the housing to open the valve.

23. The assembly of claim 22, wherein the housing includes a radially outwardly extending flange for coupling the housing to the trailer and the control member includes a radially outwardly extending flange for engaging a portion of the housing, and further comprising means for coupling the control member to the housing to seal the internal chamber of the housing.

24. The assembly of claim 22, further comprising means coupled to the housing inside the internal chamber for limiting the range of movement of the control member relative to the housing.

25. The assembly of claim 22, wherein the valve includes a ball actuator for opening and closing the valve, the valve being coupled to the housing so that the valve is located outside the internal chamber of the housing and the ball actuator is located inside the internal chamber of the housing, and the camming surface of the control member engages and depresses the ball upon rotation of the control member to open the valve.

* * * * *